Figures 5, 6:
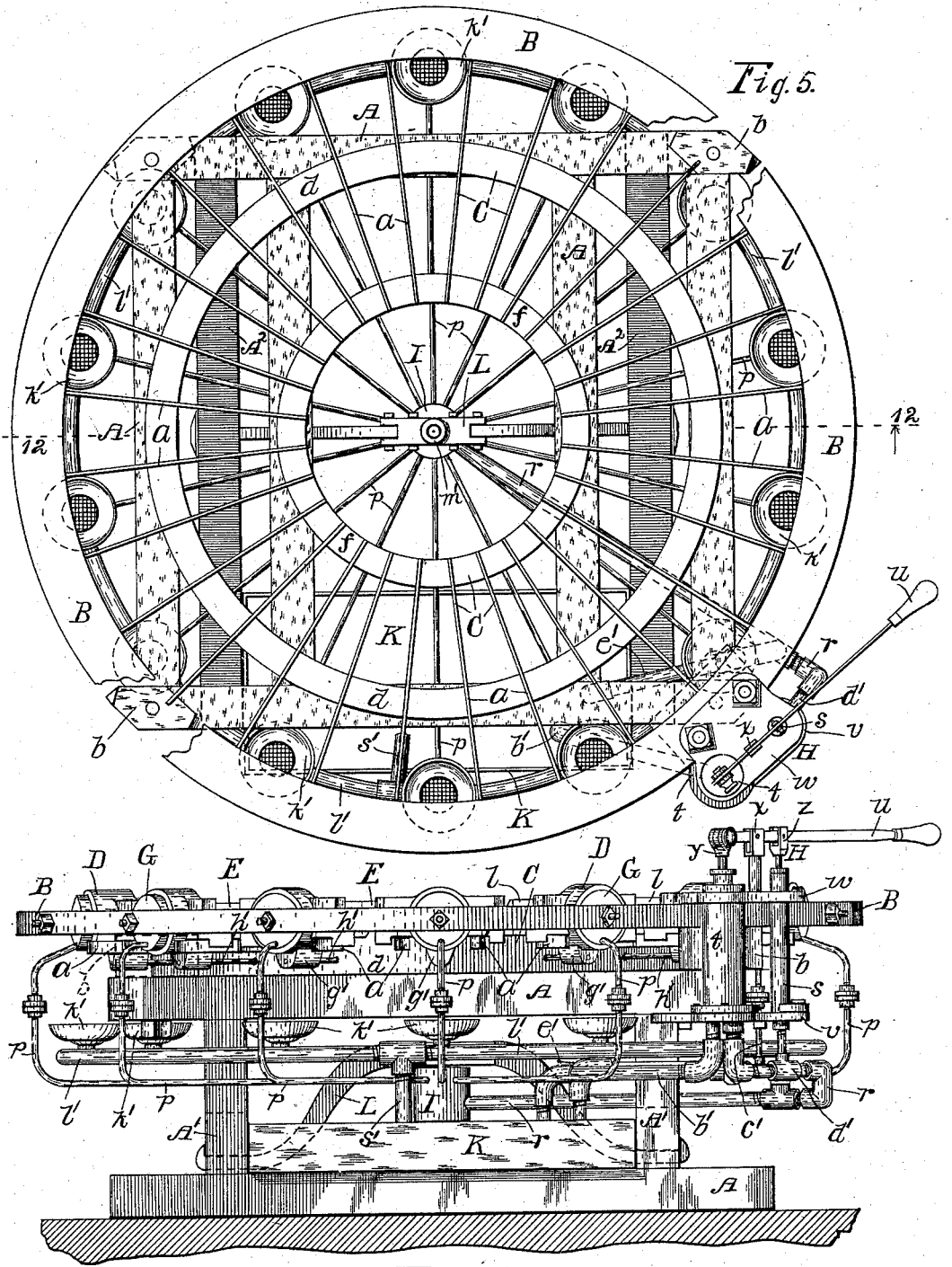

No. 748,292. PATENTED DEC. 29, 1903.
G. LATTIN.
MACHINE FOR SETTING TIRES.
APPLICATION FILED JAN. 14, 1903.
NO MODEL. 4 SHEETS—SHEET 1.
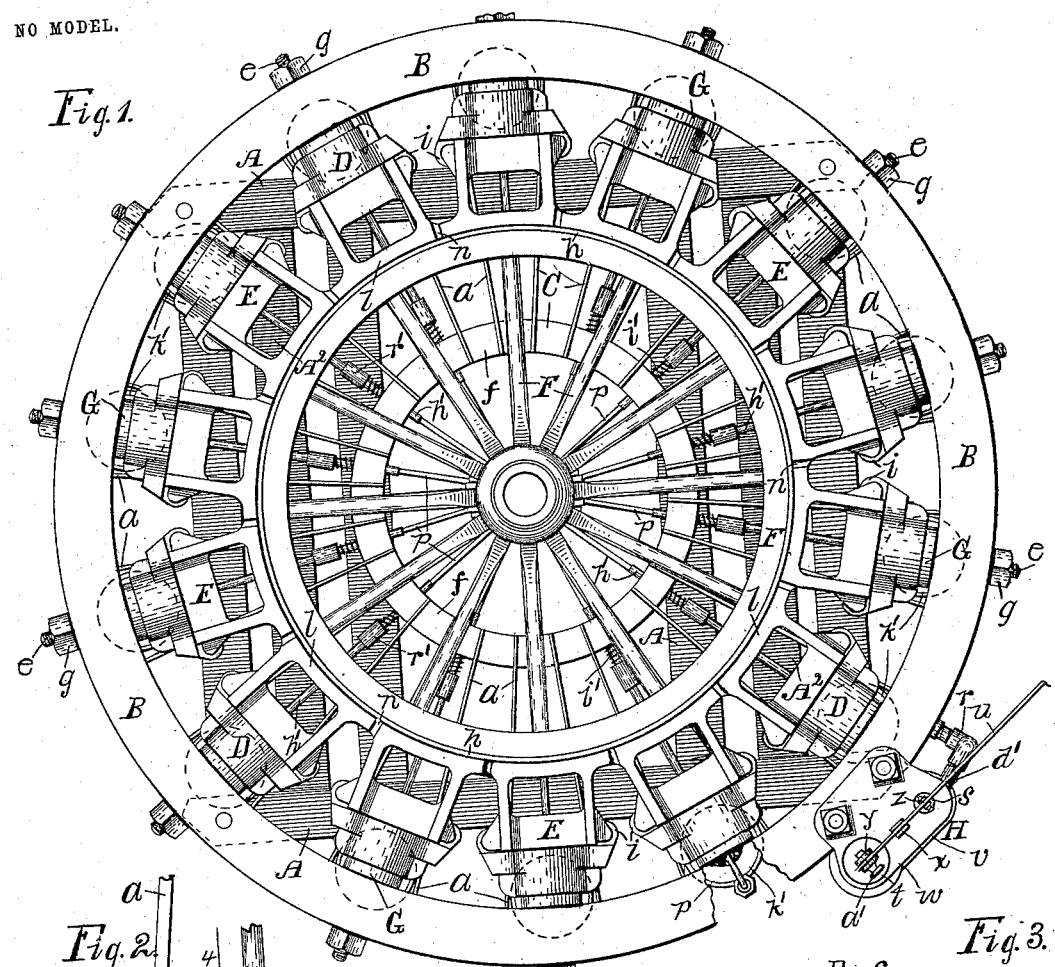
Fig. 1.
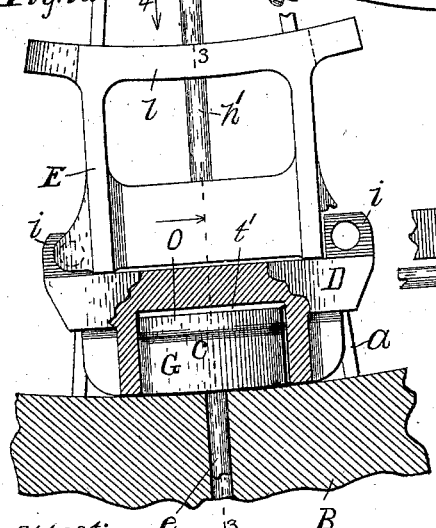
Fig. 2.
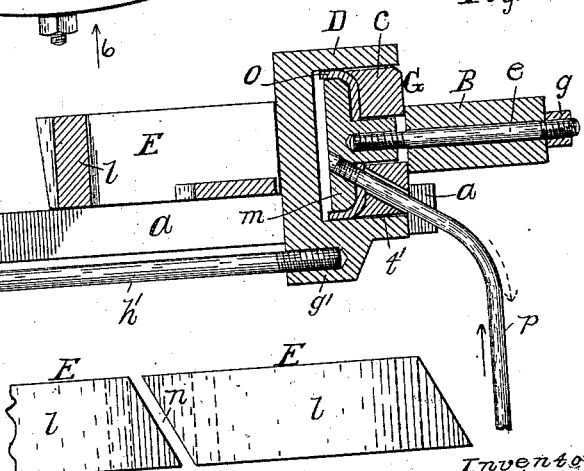
Fig. 3.
Fig. 4.
Attest: M. B. Smith. M. V. Sayles.
Inventor: George Lattin, By E. B. Whitmore, Atty.

No. 748,292. PATENTED DEC. 29, 1903.
G. LATTIN.
MACHINE FOR SETTING TIRES.
APPLICATION FILED JAN. 14, 1903.
NO MODEL. 4 SHEETS—SHEET 2.

Attest:
M. B. Smith
M. V. Bayles

Inventor:
George Lattin,
By E. B. Whitmore, Atty.

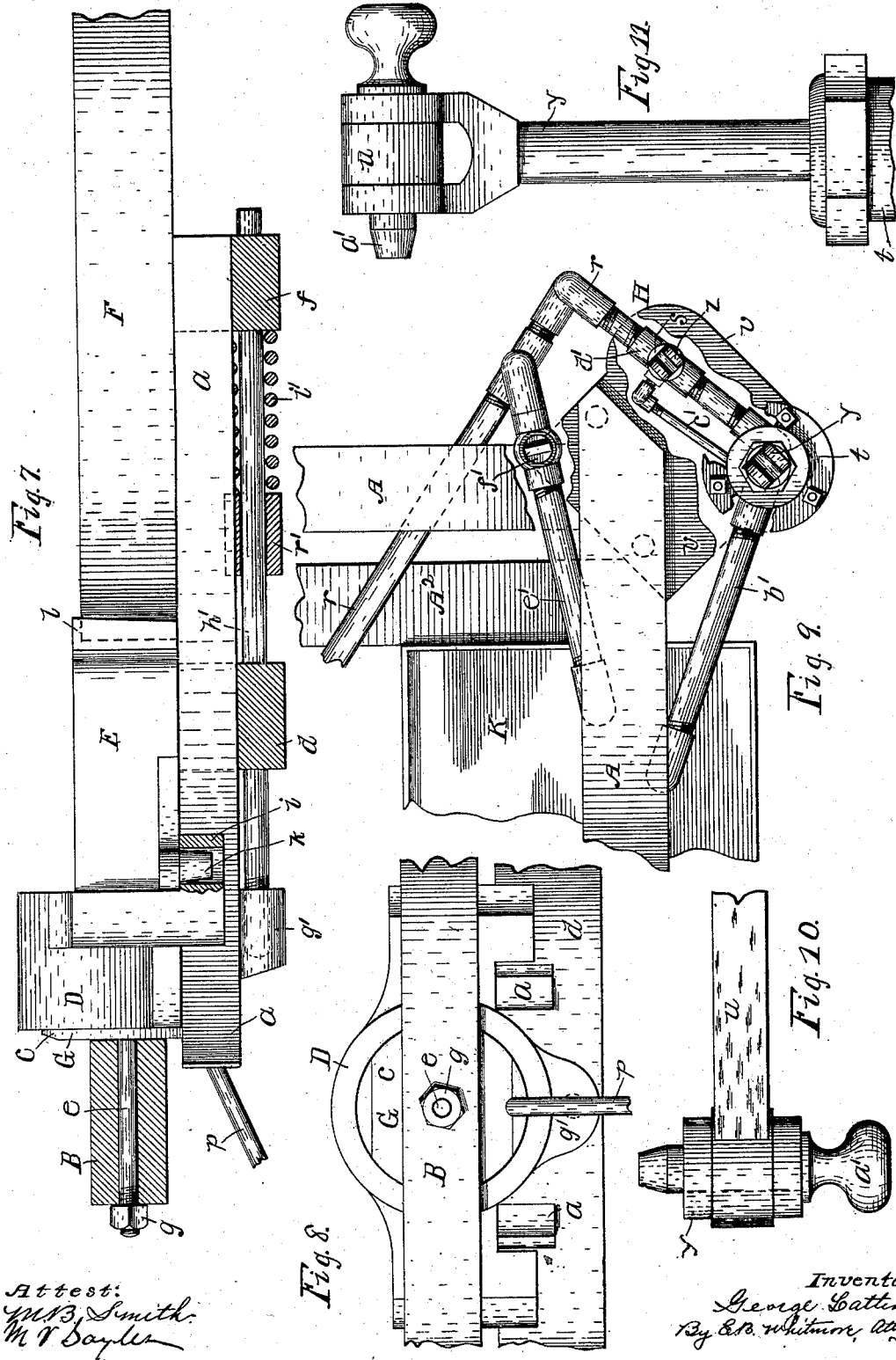

No. 748,292. PATENTED DEC. 29, 1903.
G. LATTIN.
MACHINE FOR SETTING TIRES.
APPLICATION FILED JAN. 14, 1903.
NO MODEL. 4 SHEETS—SHEET 4.
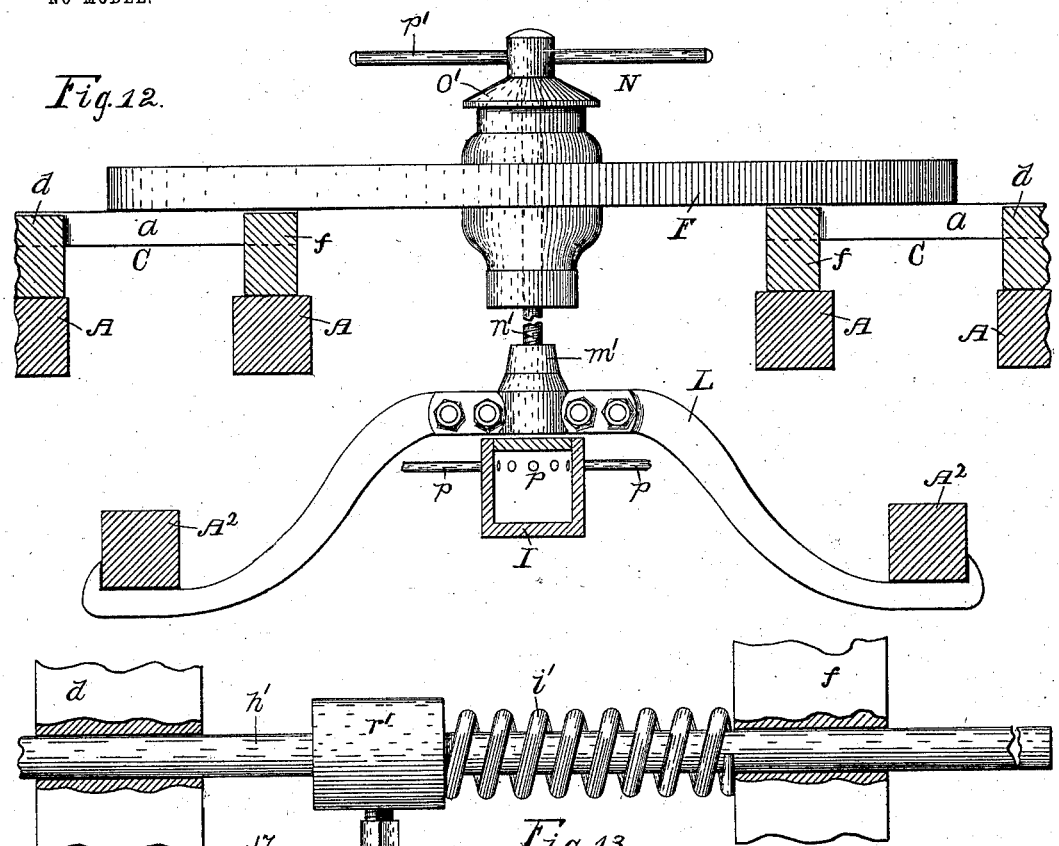
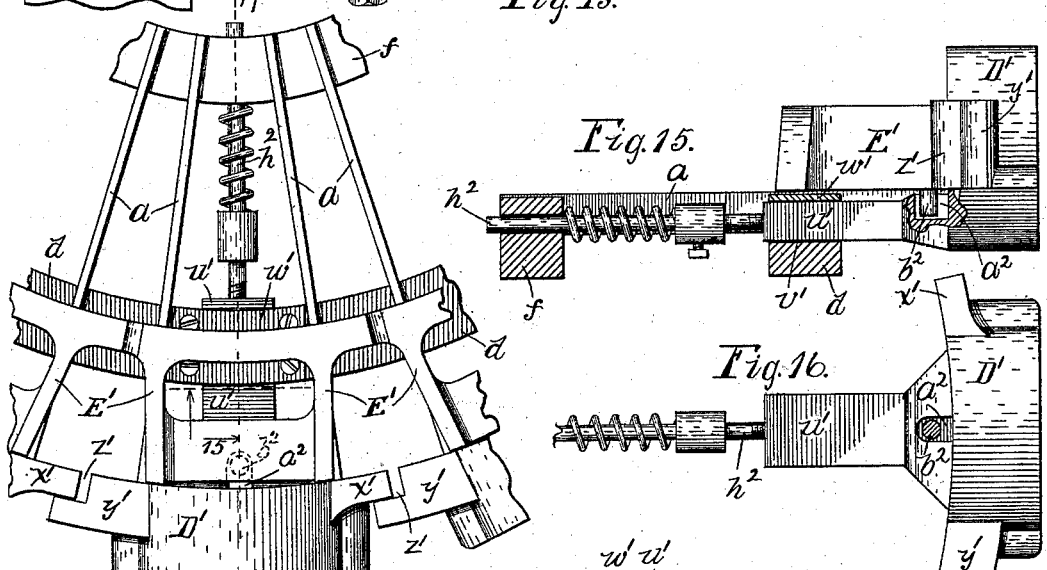
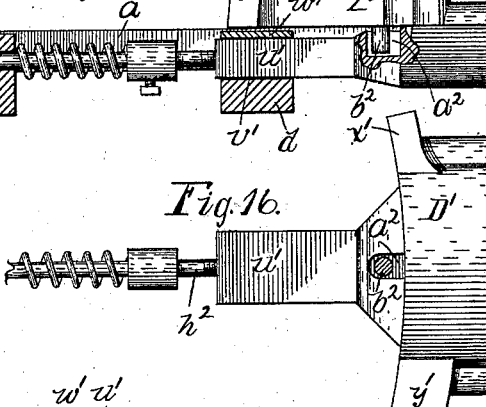
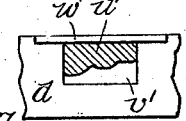
Inventor:
George Lattin.
By E. B. Whitmore, atty.
Attest:
M. B. Smith
M. V. Bayles No. 748,292. Patented December 29, 1903.

UNITED STATES PATENT OFFICE.

GEORGE LATTIN, OF ROCHESTER, NEW YORK, ASSIGNOR TO WEST TIRE SETTER COMPANY, OF ROCHESTER, NEW YORK.

MACHINE FOR SETTING TIRES.

SPECIFICATION forming part of Letters Patent No. 748,292, dated December 29, 1903.

Application filed January 14, 1903. Serial No. 139,044. (No model.)

*To all whom it may concern:*

Be it known that I, GEORGE LATTIN, of Rochester, in the county of Monroe and State of New York, have invented a new and useful Improvement in Machines for Setting Tires, which improvement is fully set forth in the following specification and shown in the accompanying drawings.

My invention is an improved machine or device for setting the metal tires of wagons and similar vehicles while cold, the invention being hereinafter fully described, and more particularly pointed out in the claims.

This improved tire-setting machine involves the use of power-rams, it being designed more particularly as a hand-machine to be operated by means of a hand pumping device, a liquid, as oil, being employed as a means for bringing a pressure upon the moving parts.

One object of my present invention is to produce a better and more perfect bed or floor for holding the vehicle-wheel while the tire is being set than has heretofore been used.

Another object of the invention is to produce a better and improved form of die for pressing the tire.

A further object of the invention is to provide better means than heretofore used for emptying or exhausting the rams after a tire has been set.

A further object of the invention is to construct the rams so that all must move forward or back in circular lines and without one getting ahead of another.

Other objects and advantages of the invention will be brought out and made to appear in the following specification, reference being had to the accompanying drawings, forming a part thereof.

Figure 1 is a plan of the machine, showing a vehicle-wheel in place, parts being omitted. Fig. 2 is a plan of a ram and associated parts, parts being horizontally sectioned by a plane coinciding with the axis of the ram. Fig. 3 is a vertical section of a ram and associated parts, taken on the dotted line 3 3 in Fig. 2. Fig. 4 is a front elevation or face view of associated dies seen as indicated by arrow 4 in Fig. 2. Fig. 5 is a plan of the bed or floor and other main parts of the machine with the upper parts removed and parts broken away. Fig. 6 is a side elevation of the machine seen as indicated by arrow 6 in Fig. 1, some minor parts being omitted. Fig. 7 is a side elevation of a ram with associated parts, various parts being vertically sectioned by different planes. Fig. 8 is a view at the outer end of a ram seen as indicated by arrow 6 in Fig. 1, parts being broken away. Fig. 9 is a plan showing the pumps and a part of the system of piping, parts being broken away. Figs. 10 and 11 are plan and elevation, respectively, showing more fully the connection of the hand-lever with the large pump. Fig. 12 is a vertical section of the frame and other parts, taken on the dotted line 12 12 in Fig. 5, parts being broken away and omitted. Fig. 13 is a plan showing a thrust-rod and adjacent parts of the floor-rings, parts being broken away. Fig. 14 is a plan showing a modification of the ram and associated parts. Fig. 15 is a side view seen as indicated by arrow 15 in Fig. 14, parts being vertically and radially sectioned on the dotted line at the point of the arrow. Fig. 16 is a plan of the ram shown in Fig. 15 detached. Fig. 17 is a cross-section of the ram on the dotted line 17 in Fig. 14. Figs. 1, 5, and 6 are drawn to a scale one-tenth size; Fig. 12, to a scale one-sixth size; Figs. 9 and 14 to 17, to a scale one-fifth size; Figs. 2, 3, and 4, to a scale one-fourth size; Figs. 7 and 8, to a scale one-third size; Fig. 13, to a scale one-half size, and Figs. 10 and 11 full size.

In the drawings, A is the frame of the machine, supporting above it in a horizontal position a steel base-ring B, resting upon elevated parts or blocks *b*, Figs. 5 and 6, at the corners of the frame.

C, Figs. 1, 5, 6, and 12, is a horizontal metallic circular bed or floor upon which parts of the machine rest and upon which also the vehicle-wheel F is placed while the tire is being set. This floor or bed consists in part of an outer and an inner iron ring *d f*, both concentric with the base-ring B. Into these rings are secured transverse radial bars *a*, Figs. 1, 2, 3, 5, 6, 7, 8, and 12, the bars being edgewise, with their upper edges slightly above the upper faces of the rings. In constructing the machine the bars are placed in the mold when the rings are cast. The molten metal forming the latter flowing around the adjacent parts of the bars and fusing into their surfaces acts to weld the rings and the bars together as in one solid piece. The surface of the floor C—that is to say, the combined upper edges of the bars $a$ in a plane—is slightly below the plane of the lower flat face of the base-ring B, (said ring being rectangular in cross-section, as appears in Fig. 7,) the outer ends of the bars extending slightly under the base-ring B.

G, Figs. 1, 2, 3, 6, 7, and 8, represents a series of cylindrical blocks or bodies equally spaced and secured to the inner face of the base-ring B by means of bolts $e$ passing radially through the ring. The axes of these cylindrical bodies are radial with the base-ring, and the bolts $e$ are provided with binding-nuts $g$ at the outer surface of the ring to hold said bodies in place. D represents a series of short movable rams having cylindrical cavities $t'$, in which to receive the bodies G, which latter serve as fixed pistons for the respective cylindrical rams to move upon longitudinally. The rams rest directly upon the floor C, upon which they have short motions forward and back in lines radial with the base-ring B.
These alternated motions of the rams are made along the respective piston-bodies G, the normal places of the rams being back near the inner surface of the base-ring, as shown in Figs. 2 and 3. The rams D are arranged in a circle with their axes meeting in a common point and are adapted to act simultaneously, and immediately in front of each is placed a block or die E, Figs. 1, 2, 3, 4, 6, and 7, which dies are pressed by the rams against the tire $h$ of the wheel to set it. The outer or rear ends of the dies abut against the adjacent faces of the respective rams, as clearly shown in Figs. 2 and 7, the rams being formed with inwardly-projecting perforated ledges $i$ to receive downwardly-projecting pins $k$ of the dies. Thus constructed and arranged each ram controls the die in front of it, the ram and its die being kept together and prevented from becoming separated, each ram withdrawing its die when the former moves backward after the tire has been set.

Where the ends of the front webs or plates $l$, Figs. 2 to 4, have been made vertical, giving each said plate a rectangular form, vertical or transverse parts of the tire between adjacent dies are not pressed, while the parts in contact with the dies are subjected to great pressure. To overcome these difficulties, I form the end of the plates $l$ slanting, as shown in Fig. 4, so that the projecting corners overlap or overhang one another, as shown. From this it will be understood that in using these dies with slanting ends some part of the tire at every vertical line across its face would be subjected to the compressive action of the dies. This renders the tire more even on its outer face and causes it to more perfectly fit and press the felly of the wheel.

The piston-bodies G, Figs. 2 and 3, consist each of an outer part $c$ and an inner part $m$, with a disk $o$ of firm fibrous packing material between. The holding-bolt $e$ is threaded into the inner part $m$, and when the bolt is drawn outward by turning the nut $g$ the piston as a whole will be drawn firmly against the inner surface of the base-ring B, and this drawing back of the parts will cause the packing-disk $o$ to be firmly held between the parts $c$ and $m$ and press the inner concave surface of the wall of the cavity $t'$ of the ram.

To press the rams D inward against the dies E, liquid, as oil, is forced into the rams through a series of pipes $p$, Figs. 1, 3, 5, 6, 7, and 8, by means of a hand-pumping apparatus H. These pipes radiate from a central oil-chamber I, Figs. 5, 6, and 12, piercing at their outer ends the respective piston-bodies G, as clearly shown in Fig. 3. The oil, drawn from a tank K, held by the frame A, is forced by the pump device through a main pipe $r$ into the chamber I and thence through the pipes $p$ into the rams.

The pump device H, Figs. 1, 5, 6, and 9, comprises a primary major pump $t$ and companion minor pump $s$, with operating hand-lever $u$ common to both. These pumps are held in vertical positions by a base-plate $v$, secured rigidly to an upper timber of the frame A, and an upper plate $w$, secured to the base-ring B. The operating-lever $u$ is fulcrumed in a standard $x$, rising from the plate $w$ midway between the pumps, both rods $y$ $z$ of the pumps being connected with the lever. When a vehicle-wheel F is placed in the machine to have its tire set, the dies E primarily stand back out of the way of the wheel with space between them and the tire, and to move the dies forward quickly through this space to touch the tire both pumps $t$ $s$ are used; but when the dies begin to press the tire and it becomes necessary to give them slower and more forceful motions the large pump $t$ is disconnected from the lever $u$, this being done by withdrawing the pin $a'$, Figs. 1, 5, 10, and 11, leaving the small and more powerful pump $s$ only to act in producing a high pressure in the rams D and against the tire of the wheel. The pumps $t$ $s$ are of the ordinary kind known as "force" pumps, the former drawing oil from the tank K through a pipe $b'$, Figs. 5, 6, and 9, and the pump $s$ through a pipe $c'$, leading from said main suction-pipe $b'$. Both pumps force oil into the main pipe $r$, leading to the chamber I, through a connecting-pipe $d'$, all of which pipes, together with the pump connections, &c., being of common kind and use and requiring no further mention here. To exhaust the oil from the rams, a discharge branch pipe $e'$ is employed connecting the pipe $r$ with the tank K. This pipe $e'$ is provided with a cock $f'$, normally closed, but which when open serves to complete a continuous passage for the oil from the rams back to the tank K through the several pipes $p$, the chamber I, the main pipe $r$, and the branch pipe $e'$.

In constructing the machines for light work I form the rams D with downwardly-projecting parts $g'$, Figs. 3, 6, 7, and 8, at their under sides, each holding a horizontal radial thrust-rod $h'$, Figs. 1, 2, 3, 6, 7, and 12, piercing the floor-rings $d\, f$. These rods are provided with coil-springs $i'$ in positions to press the inner ring $f$, as shown, being confined by thimbles $r'$, longitudinally adjustable on the rods, serving also to regulate the tension of the springs. When the rams are pressed inward toward a common center by the action of the pumps, as described, the springs $i'$ will be compressed against the ring $f$, and when the cock $f'$ in the outflow-pipe $e'$ is opened to allow an outflow of the oil from the rams the springs $i'$ will push the rams back to their normal places, carrying with them the dies E away from the tire of the wheel by means of the pins $k$ and the coacting ledges $i$. Thus the rams are moved in opposite directions upon the piston-bodies G by fluid-pressure and by spring action, alternately carrying the dies forward and then back along the floor of the machine.

A series of drip-cups $k'$, Figs. 1, 5, and 6, is provided, one cup being placed beneath each piston-body G to catch any oil that may escape from the rams D. These cups have downwardly-projecting tubes threaded into a circular horizontal tube or pipe $l'$, held by the corner-posts $A'$ of the frame A. A short discharge-pipe $s'$, leading from the drip pipe $l'$, serves to convey oil that may enter the pipe $l'$ back into the supply-tank K.

L, Figs. 5, 6, and 12, is a cross tree or yoke held by the lower horizontal timbers $A^2$ of the frame as a means for holding the vehicle-wheel down against the floor while being acted upon. This yoke is formed with a middle vertical internally-threaded part or hub $m'$ concentric with the circular floor C in position to receive the lower threaded end of a hand-screw N, passed downward through the hub of the wheel. When the wheel is centrally in place upon the floor, the threaded stem $n'$ of the hand-screw N is passed through the hub of the wheel and turned into the threaded part $m'$ of the yoke by means of the lever $p'$. A collar $o'$ of the hand-screw pressing the upper end of the hub of the wheel acts to hold the latter securely in place upon the floor.

The ram D and the dies E as constructed and above described are those commonly used for the lighter class of work. For heavier work I employ larger and more powerful rams $D'$, Figs. 14 to 16, in some ways differently formed than those referred to by D, using with these rams dies $E'$, slightly modified in form. These larger rams are formed with prismatic radial extensions or tongues $u'$, preferably rectangular in cross-section, reaching horizontally inwardly through the outer floor-ring $d$, in which they have bearings and by means of which the rams are controlled. The ring $d$ is formed with rectangular openings $v'$, Fig. 17, for the tongues, retaining-caps or plates $w'$ being provided secured to the ring above the tongues to confine the latter in the respective openings $v'$. When the rams move forward and back upon the floor C, as above described, the tongues $u'$ slide longitudinally in their bearings in the ring $d$, the thrust-rods $h^2$ being in this form of the parts shortened and threaded in the ends of the tongues, as shown. These tongues, confined by the ring $d$, serve to keep the rams down fairly upon the floor of the machine and prevent their tilting or raising at their forward ends, which is liable to occur when the pressure of the dies against the tire is great and not central—that is to say, above or below the middle plane of the tire. The outer surfaces of the broad tires of heavy vehicles are frequently not truly cylindrical, but more or less inclined or conical. This causes the dies to press the tires unevenly above or below the middle horizontal plane of the wheel, resulting in a tendency to tilt the rams, as stated. The thrust-rods $h'$, passing through and having bearings in the ring $d$, are sufficient to hold the rams in place upon the floor when doing light work, the heavier tongues $u'$ being necessary only for heavy work, as stated. The heavier rams $D'$, I form with right and left laterally-extended overlapping parts $x'\, y'$, Figs. 14 to 16, engaging one another, so that all the rams must move forward or back alike and together and not one ahead of another, as is sometimes liable to occur. These oppositely-extended parts of the rams are unequal in size, the larger parts $y'$ extending toward the left and the smaller parts $x'$ toward the right, the former having recesses $z'$, occupied by the parts $x'$, as shown. By inspecting Fig. 14 it will be seen that on account of the manner in which the parts $y'$ and $x'$ engage each other each ram is prevented from moving either backward or forward of the adjacent rams. The pressure of the extended parts $y'\, x'$ of each ram against the corresponding parts of the two adjacent rams is in two opposite directions, one forward and the other backward, so that no ram can move out of its place in the circle of rams, but all must advance or retreat together. Also in constructing these heavy rams $D'$, I omit the perforated extended parts $i$, Figs. 2 and 7, of the light rams D and the coacting parts $k$ of the dies E and instead form each ram $D'$ with a single central cavity $a^2$, Figs. 14, 15, and 16, for receiving a single middle pin $b^2$ of the coacting die $E'$. This manner of connecting the rams and their associated dies effectually keeps them from becoming separated as they move forward and backward in the act of setting tires.

What I claim as my invention, and desire to secure by Letters Patent, is—

1. In a tire-setting machine, the combination with a floor composed of an inner and an outer ring and means connecting said rings, of rams having extended parts movable through the outer ring and held against upward movement, dies coacting with said rams, and means for moving said rams.

2. In a tire-setting machine, the combination with a floor composed of an inner and an outer ring and means connecting said rings, of rams having extended parts movable through the outer ring, and held against upward movement, dies mounted for movement radially of the floor and coacting with said rams, means for moving the rams, and means for holding each ram and its coacting die together.

3. In a tire-setting machine, the combination with a base-ring and a floor independent of the base-ring and upon a lower plane and comprising an inner and an outer ring and connecting-rods, rams having extended tongues movable through the outer floor-ring and piston-bodies guided in the base-ring, dies for coöperation with the rams, said rams having lateral extended overlapping parts.

4. In a tire-setting machine, the combination with the base-ring and the floor composed of an inner and an outer ring independent of the base-ring, rods connecting the floor-rings, rams having piston-bodies and dies between the base-ring and the outer floor-ring and means depending from the dies to engage the rams to cause the dies and rams to move together, and means on the rams for preventing tilting of the rams, said rams having their piston-bodies guided in the base-ring, said means coacting with the outer floor-ring.

5. In a tire-setting machine, the combination with the base-ring and the floor composed of an inner and an outer ring and connecting-rods, said floor-rings being independent of the base-ring, of rams with extended parts having central cavities, and dies having depending pins received in said cavities, said rams having piston-bodies guided in the base-ring.

6. In a tire-setting machine, the combination with the base-ring and the floor composed of an inner and an outer ring and connecting-rods, said floor-rings being independent of the base-ring, of rams provided with lateral overlapping parts $x'$ and $y'$ and with extended parts having central cavities, and dies in radial alinement with said rams and having depending pins received in said cavities, said rams having piston-bodies guided in the base-ring.

7. In a tire-setting machine, the combination with the base-ring and the floor composed of an inner and an outer ring and connecting-rods, said floor-rings being independent of the base-ring, and the floor being in a plane below that of the base-ring, of rams provided with lateral overlapping parts $x'$ $y'$ and with extended parts having central cavities, and dies in radial alinement with the rams and having depending means received in said cavities said rams having piston-bodies guided in the base-ring, and means on the base-ring for moving the rams and dies forward and back.

8. In a tire-setting machine, the combination of a base-ring, a floor independent thereof and composed of an inner and an outer ring disposed within the base-ring, means for connecting said inner and outer rings independent of the base-ring, rams and dies, the former supported on the base-ring and the rams and dies disposed for movement together, means for preventing the tilting of the rams and means for connecting together the rams and dies and for preventing each ram from moving either backward or forward of the adjacent rams.

9. In a tire-setting machine, the combination of a base-ring having an annular series of radially-movable rams mounted thereon, a die connected to each ram, a wheel-supporting floor comprising concentric rings and radial connecting-bars arranged within said base-ring and below the plane of the same, the outer one of said floor-rings having a series of apertures therethrough and the rams having extensions slidably held in said apertures.

In witness whereof I have hereunto set my hand, this 3d day of January, 1903, in the presence of two subscribing witnesses.

GEORGE LATTIN.

Witnesses:
ENOS B. WHITMORE,
MINNIE SMITH.